United States Patent
Dahlman et al.

(10) Patent No.: US 6,339,646 B1
(45) Date of Patent: Jan. 15, 2002

(54) SLOTTED MODE CODE USAGE IN A CELLULAR COMMUNICATIONS SYSTEM

(75) Inventors: Erik Dahlman, Bromma; Fredrik Ovesjö, Solna, both of (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/185,395

(22) Filed: Nov. 3, 1998

(51) Int. Cl.[7] .................................................. H02K 1/10
(52) U.S. Cl. ........................ 380/273; 380/33; 380/275
(58) Field of Search ........................... 380/273, 33, 34, 380/275, 47; 375/140, 142; 370/208, 335, 337, 342

(56) References Cited

U.S. PATENT DOCUMENTS

| | | | | |
|---|---|---|---|---|
| 5,533,014 A | * | 7/1996 | Willars et al. ............... | 370/335 |
| 5,566,164 A | * | 10/1996 | Ohlson ........................ | 370/320 |
| 6,009,091 A | * | 12/1999 | Stewart et al. ............... | 370/342 |
| 6,061,023 A | * | 5/2000 | Daniel ........................ | 342/354 |
| 6,084,884 A | * | 7/2000 | Adachi ........................ | 370/441 |
| 6,163,524 A | * | 12/2000 | Magnusson et al. ........ | 370/208 |

FOREIGN PATENT DOCUMENTS

| | | | |
|---|---|---|---|
| EP | 0814581 A2 | 12/1997 | ............ H04J/11/00 |
| EP | 102086 | 5/1999 | |
| WO | 9429981 | 12/1994 | ............ H04J/13/00 |
| WO | 9503652 | 2/1995 | ............ H04B/7/26 |

* cited by examiner

*Primary Examiner*—Thomas R. Peeso
(74) *Attorney, Agent, or Firm*—Jenkens & Gilchrist, P.C.

(57) ABSTRACT

The downlink channelization code limitation problem encountered in spread spectrum or CDMA cellular systems is resolved by using codes from a different, non-orthogonal code set when operating in the slotted mode. The non-orthogonal code sets can be constructed by using the same channelization code tree, but applying a different scrambling code.

28 Claims, 2 Drawing Sheets

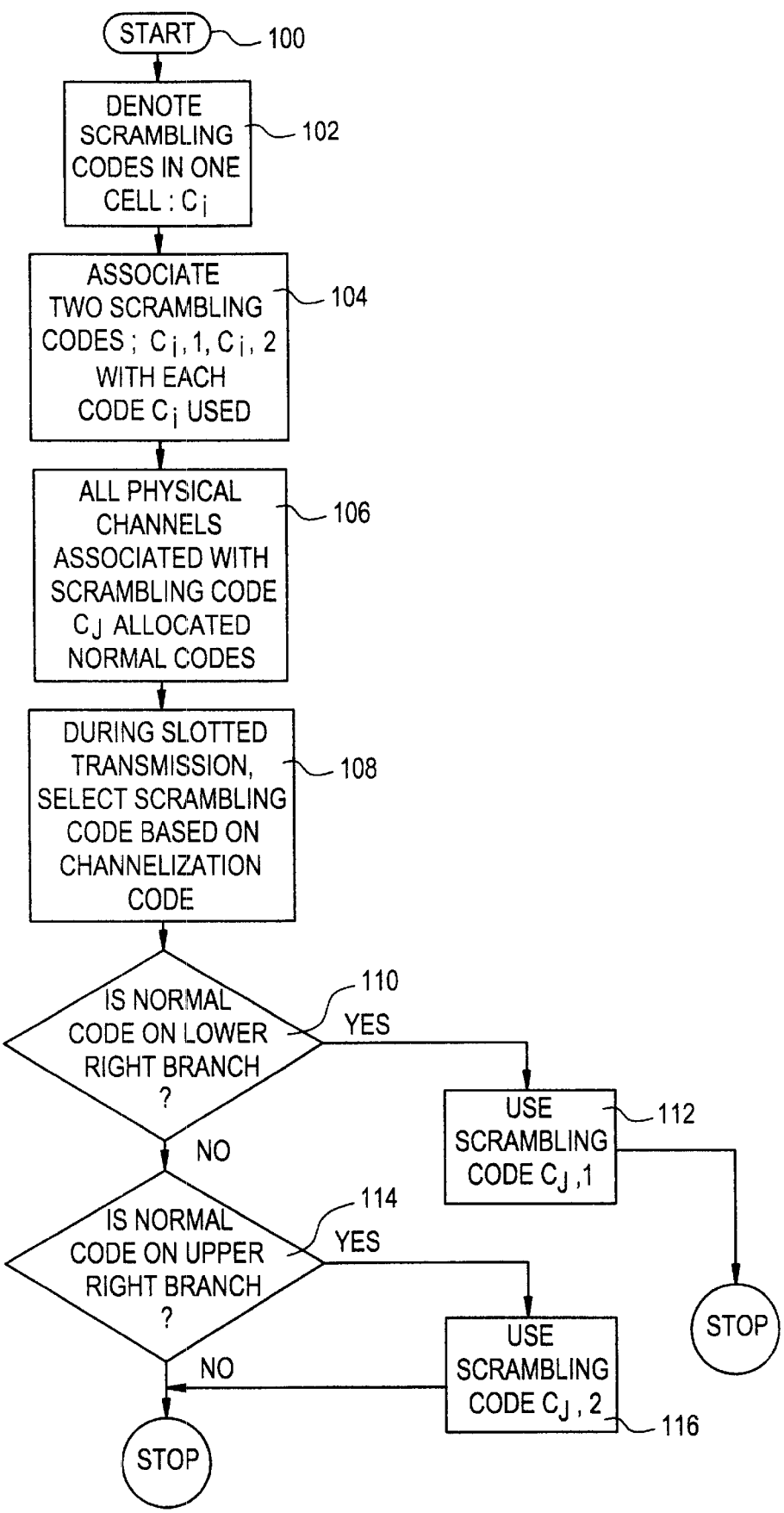

SLOTTED MODE CODE USAGE IN A CELLULAR COMMUNICATIONS SYSTEM

BACKGROUND OF THE INVENTION

1. Technical Field of the Invention

The present invention relates generally to the mobile communications field and, in particular, to a method that compensates for channelization code limitation during a slotted mode operation in a cellular communication system.

2. Description of Related Art

In existing spread spectrum or Code Division Multiple Access (CDMA) systems, soft intra-frequency handovers are normally used to maintain communications. To perform such soft intra-frequency handovers, a mobile station commences communications with a new base station on the same CDMA frequency assignment, before terminating communications with the old base station. However, in the next generation cellular systems (including, for example, the Wide-Band CDMA or WCDMA systems), the use of inter-frequency handovers (handovers between frequencies) will be essential. As such, handovers between frequencies are needed in CDMA and all other types of cellular systems to support a number of functions. For example, handovers between frequencies are used to support hot-spot scenarios (where a cell uses more carriers than the surrounding cells), hierarchical cell structures (where macro, micro and pico layers are on different frequencies), handovers between different operators, and handovers to other systems (e.g., to the Global System for Mobile Communications or GSM, residing in other frequency bands). The key to providing adequate support of inter-frequency handovers is to provide efficient support of the inter-frequency measurements made. As such, in order to support mobile station inter-frequency measurements in spread spectrum or CDMA systems, a downlink slotted mode of operation has been specified.

In the ARIB, ETSI and TIA specifications for CDMA systems, a combination of channelization codes and scrambling codes are used to separate different physical channels. The data to be transmitted is first spread using the channelization code, and then scrambled using a scrambling code. Typically, a base station will use only one scrambling code for all physical channels, but additional scrambling codes can be used to increase the number of available codes (e.g., to avoid a shortage of codes when introducing adaptive antennas to boost capacity). A method for generating multiple code sets using multiple scrambling codes is disclosed in Swedish Application No. PCT SE 98/01541.

FIG. 1 is a diagram of a channelization code tree (channelization codes are best described by a tree structure). The tree at the upper left in FIG. 1 illustrates the tree construction principle for channelization codes. As shown, codes on the same level in the tree (e.g., 1,1 and 1,-1) are orthogonal to one another and have the same spreading factor. If a physical channel is spread with one code in the tree, and another physical channel is spread with another code, which is not on a branch underlying the first code, or on the path from the first code to the root of the tree, the spread physical channels will be orthogonal. Every physical channel is allocated a spreading code from the tree, with spreading factors that match the respective data rates. Subsequent to the channelization process, a scrambling code is applied to the spread data.

In order to support seamless inter-frequency handovers, it must be possible to make inter-frequency measurements on other frequencies without disturbing the normal data flow. Since the user equipment receives the downlink signal continuously, there is no time to carry out measurements on other frequencies using an ordinary receiver. A second receiver can be used to make measurements on other frequencies. However, in order to enable single-receiver terminals to make inter-frequency measurements, a downlink slotted mode has been specified for CDMA systems, in both the ARIB and ETSI technical specifications.

When a base station is operating in the downlink slotted mode, the base station decreases the processing gain of the connection, either by increasing the channel coding rate or reducing the spreading factor by two. A 10 ms data frame can then be transmitted in less than 10 ms, as illustrated by the downlink slotted mode transmission diagram shown in FIG. 2 (with a reduced spreading factor solution shown). As such, the transmission is accomplished with higher power than normal, in order to compensate for the decreased processing gain. Using this approach, an idle period of up to 5 ms is created during which no data is to be received by the user equipment. This idle period can be used to tune the receiver to other frequencies, and signal strength measurements can be performed on those frequencies.

Commonly-assigned U.S. Pat. No. 5,553,014 discloses the use of a slotted mode operation through change of a spreading factor. Commonly-assigned U.S. patent application Ser. No. 636,646 discloses the use of an increased channel coding rate. Finally, commonly-assigned U.S. patent application Ser. No. 636,648 discloses a slotted mode operation using multi-code transmissions.

A significant problem exists with the existing slotted mode approaches. In general, the existing increased channel coding rate solutions will always need a fallback solution using a lower spreading factor, because the rate cannot be increased above a certain limit where quality degradation sets in. For example, if ½ rate coding is used, then increasing that rate even more during a slotted mode operation will be difficult. Consequently, it can be concluded that a mode in which a lower spreading factor is used will be needed for a slotted mode operation. As such, this requirement has been identified for standardization in the ETSI technical specification.

When the spreading factor is changed during the slotted frames, it could lead to problems with channelization code shortages. In the downlink, all users share the same set of channelization codes. For example, there are 128 available codes of length 128, which means that 128 channels can be carried simultaneously with a spreading factor of 128. As such, if one channel requires a spreading factor of 64, this will remove two possible codes of length 128, because these codes will no longer be orthogonal to the code of length 64. If the lowest possible spreading factor is reduced by a factor of two due to slotted mode transmissions, this means that the number of available codes that can be allocated to different channels is halved. Consequently, since the code resources were already limited from the beginning, the result of allocating shorter codes for use in a slotted mode operation can be a code limited system. In other words, the system operating in the slotted mode could have its downlink capacity limited by the number of available downlink channelization codes and not by interference. However, as described in detail below, the present invention resolves the above-described problems.

SUMMARY OF THE INVENTION

In accordance with the present invention, the downlink channelization code limitation problem encountered in spread spectrum or CDMA cellular systems is resolved by using codes from a different, non-orthogonal code set when operating in the slotted mode. The non-orthogonal code sets can be constructed by using the same channelization code tree, but applying a different scrambling code.

An important technical advantage of the present invention is that channelization code limitations are compensated for while operating in the slotted mode.

Another important technical advantage of the present invention is that the spreading factor can be halved for slotted mode operations in a spread spectrum or CDMA cellular communications system, without reducing the number of channelization codes available.

Still another important technical advantage of the present invention is that seamless inter-frequency measurements can be made for all services in a cellular communications system, regardless of the channel coding rate, etc.

Yet another important technical advantage of the present invention is that it makes complex reallocation of code resources in a slotted mode of operation unnecessary.

Still another important technical advantage of the present invention is that the behavior in the slotted mode operation is deterministic, so the network and user equipment need only agree on when to perform slotted transmission, and not how to perform them.

BRIEF DESCRIPTION OF THE DRAWINGS

A more complete understanding of the method and apparatus of the present invention may be had by reference to the following detailed description when taken in conjunction with the accompanying drawings wherein:

FIG. 3 is a flow diagram that illustrates a method that can be used for generating scrambling codes for a slotted mode of operation, in accordance with a preferred embodiment of the present invention.

DETAILED DESCRIPTION OF THE DRAWINGS

The preferred embodiment of the present invention and its advantages are best understood by referring to FIGS. 1–4 of the drawings, like numerals being used for like and corresponding parts of the various drawings.

Essentially, in accordance with the present invention, the downlink channelization code limitation problem encountered in spread spectrum or CDMA cellular systems is resolved by using codes from a different, non-orthogonal code set when operating in the slotted mode. The non-orthogonal code sets can be constructed by using the same channelization code tree, but applying a different scrambling code.

Specifically, FIG. 3 is a flow diagram that illustrates a method that can be used for generating scrambling codes for a slotted mode of operation, in accordance with a preferred embodiment of the present invention. At step 102, denote the scrambling codes used within one cell, $C_i$, I=1,...,N, where N is the maximum number of scrambling codes that can be used within the cell. At step 104, two other scrambling codes, $C_{i,1}$ and $C_{i,2}$ are associated with each scrambling code, $C_i$, used. At step 106, all physical channels associated with a certain scrambling code, $C_j$, are allocated channelization codes to use during normal (i.e., non-slotted) transmissions, but still ensuring that the code allocation results in orthogonal channels (i.e., normal allocations).

At step 108, during a slotted transmission, the channelization code to be used is above the code used for normal transmissions. In other words, the channelization code which is one level closer to the root of the code tree is used. At step 110, the network determines if the channelization code used during a normal transmission is on a lower branch of the code tree (e.g., the lower right branch, as seen from the viewpoint of the channelization code used during the slotted transmission). If so, then at step 112, the scrambling code, $C_{j,1}$, should be used for scrambling. On the other hand, if at step 114, the channelization code used during a normal transmission is on an upper branch of the code tree (e.g., the upper right branch, as seen from the viewpoint of the channelization code used during the slotted transmission), at step 116, the scrambling code, $C_{j,2}$, should be used for scrambling.

Figure 1:
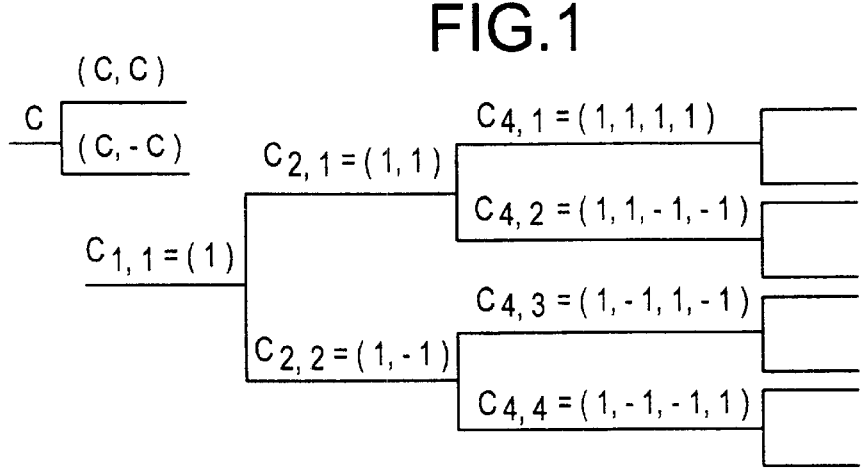
FIG. 1 is a diagram of a channelization code tree for a spread spectrum or CDMA cellular communications system.
Figure 2:
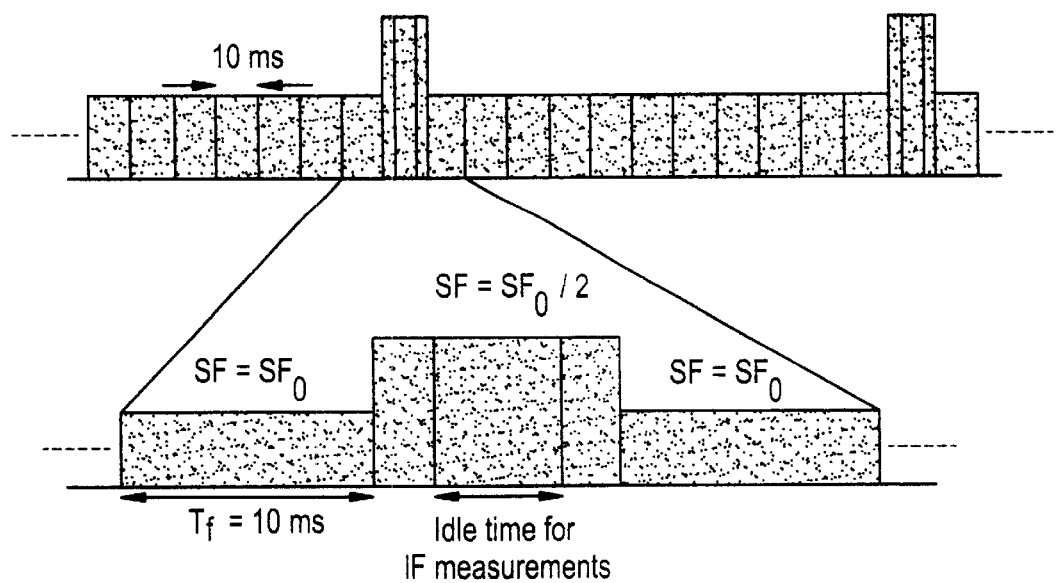
FIG. 2 is a diagram that illustrates a downlink slotted mode transmission frame structure with a reduced spreading factor solution.

For example, to illustrate the present invention, refer again to the exemplary code tree shown in FIG. 1. As shown, the physical channel spread with the code, $C_{4,3}$, and scrambled by the code, $C_1$, during a normal transmission, would be spread by the code, $c_{2,2}$, and scrambled by the code, $C_{1,2}$, during a slotted transmission. Similarly, the physical channel spread with the code, $C_{4,4}$, and scrambled by the code, $C_1$, during a normal transmission, would be spread by the code, $c_{2,2}$, and scrambled by the code, $C_{1,1}$, during a slotted transmission.

As such, the scrambling codes to be used for slotted transmission ($C_{j,1}$ and $C_{j,2}$), can be readily derived from the normal transmission scrambling code, $C_j$. For example, in an existing CDMA system, the different scrambling codes are generated by loading shift registers that generate the scrambling codes, with different contents.

The scrambling codes typically used in the existing systems are built from, for example, Gold codes, which ensures that the output sequences from the shift register are different for different starting values. Assuming that the normal mode transmission scrambling code, $C_j$, is generated using a certain starting value, then the scrambling codes to be used for slotted transmissions, $C_{j,1}$ and $C_{j,2}$, can be generated by loading the shift register with a slightly modified value. For example, if two bits in the starting value for the normal mode transmission scrambling code, $C_j$, are "00", the associated slotted mode scrambling codes, $C_{j,1}$ and $C_{j,2}$, can be generated by changing those two bits in the scrambling code generator shift register to "01" and "11", respectively. As an alternative to loading the shift register with a slightly modified value in order to generate the scrambling codes to be used for slotted transmissions, the same scrambling code as for a normal transmission could be used, but with a different code phase.

Figure 4:
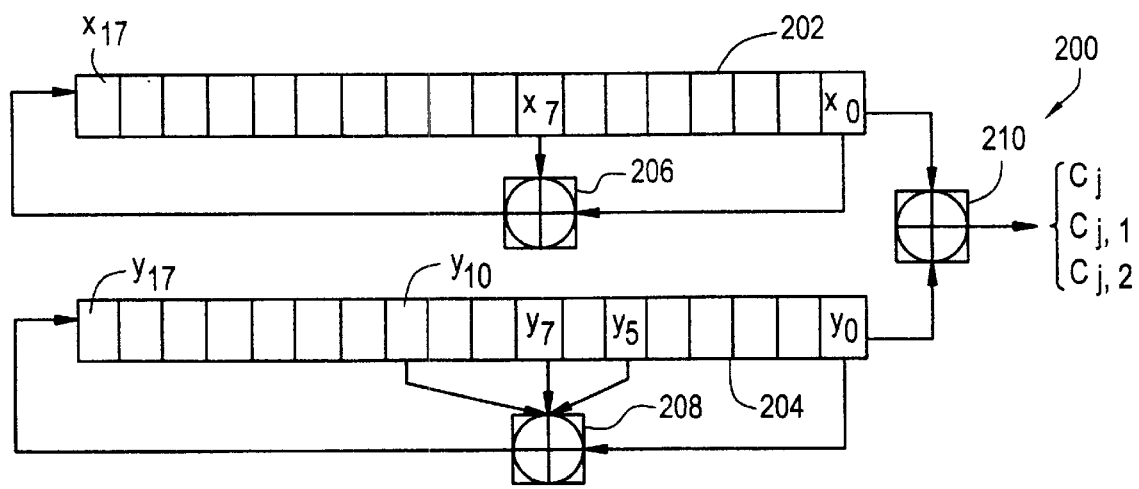
FIG. 4 is a diagram of an exemplary shift register arrangement that can be used to generate scrambling codes for normal and slotted transmissions, in accordance with the preferred embodiment of the present invention.

With respect to the first alternative, FIG. 4 is a diagram of an exemplary shift register arrangement that can be used to generate scrambling codes (e.g., $C_j$, $C_{j,1}$, $C_{j,2}$) for normal and slotted transmissions, in accordance with the preferred embodiment of the present invention. Referring to the exemplary scrambling code generating shift register arrangement 200 shown in FIG. 4, one or more shift register components 202, 204 are connected to XOR gates 206, 208 and 210 to generate scrambling codes for use in normal mode or slotted mode transmissions. For example, the scrambling codes can be generated by loading the start values into the shift register components (202, 204) and then clocking the shift register. As an example, let $n_{15} \ldots \ldots n_2 n_1 n_0$ represent an arbitrary binary number. This number can typically be related to a scrambling code number to use for a normal transmission (e.g., j). To generate a scrambling code for a normal transmission mode, $C_j$: load in one shift register (e.g., 202) $x_{17}x_{16}x_{15} \ldots x_2 x_1 x_0 = 00 n_{15} \ldots n_2 n_1 n_0$, and load in the other shift register (e.g., 204) $y_{17}y_{16}y_{15} \ldots y_2 y_1 y_0 = 111 \ldots 111$ (all ones). To generate a scrambling code for a slotted mode transmission, $C_{j,1}$: load in a shift register (e.g., 202) $x_{17}x_{16x15} \ldots x_2 x_1 x_0 = 01 n_{15} \ldots n_2 n_1 n_0$, and load in the other shift register (e.g., 204) $y_{17}y_{16}y_{15} \ldots y_2 y_1 y_0 = 111 \ldots 111$ (all ones). To generate a second scrambling code for the slotted transmission, $C_{j,2}$: load in the shift register (e.g., 202) $x_{17}x_{16}x_{15} \ldots x_2 x_1 x_0 = 11 n_{15} \ldots n_2 n_1 n_0$, and load in the other shift register (e.g., 204) $y_{17}y_{16y15} \ldots y_2 y_1 y_0 = 111 \ldots 111$ (all ones).

Additionally, as another alternative, instead of generating other scrambling codes to be used for slotted transmissions, a code comprising, for example, a combination of codes, such as a channelization code plus a scrambling code plus another code (e.g., Bent sequence) can be used for slotted transmissions. Moreover, the present invention is not intended to be limited only to downlink transmissions, and the same concept described above for generating scrambling codes for slotted mode transmissions can be applied as well to the uplink.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for allocating scrambling codes in a spread spectrum cellular communications system, comprising the steps of:
    generating a first scrambling code and a first channelization code for a normal transmission mode; and
    generating a second scrambling code and a second channelization code for a slotted transmission mode.

2. The method of claim 1, wherein said first scrambling code is represented as a code $C_j$, and said second scrambling code is represented as at least one of a code $C_{j,1}$ or a code $C_{j,2}$.

3. The method of claim 1, wherein said second channelization code is one level closer to a root of a channelization code tree than said first channelization code.

4. The method of claim 1, wherein said first scrambling code, said first channelization code, said second scrambling code, and said second channelization code are generated for scrambling and channelization in a physical channel.

5. The method of claim 1, wherein said spread spectrum system comprises a CDMA system.

6. The method of claim 2, wherein each of said code $C_{j,1}$ and said code $C_{j,2}$ are generated by modifying a start value used for said normal transmission mode in at least one of a scrambling code generator shift register or a plurality of scrambling code generator shift registers.

7. The method of claim 2, wherein each of said code $C_{j,1}$ and said code $C_{j,2}$ are generated with a different code phase than said first scrambling code.

8. The method of claim 1, wherein said slotted transmission mode is used for an inter-frequency handover measurement.

9. The method of claim 1, wherein said second channelization code comprises said first channelization code and a modifying code.

10. The method of claim 1, wherein said second scrambling code comprises said first scrambling code and a modifying code.

11. The method of claim 9 or 10, wherein said modifying code comprises a Bent sequence.

12. The method of claim 2, further comprising the steps of:
    if said first channelization code is located on a lower branch of a channelization code tree, selecting code $C_{j,1}$ for scrambling during a slotted mode transmission; and
    if said first channelization code is located on an upper branch of said channelization code tree, selecting code $C_{j,2}$ for scrambling during said slotted mode transmission.

13. A spread spectrum cellular communications system comprising:
    a base station, said base station including:
    means for generating a first scrambling code and a first channelization code for a normal transmission mode; and
    means for generating a second scrambling code and a second channelization code for a slotted transmission mode.

14. The system of claim 13, wherein said first scrambling code is represented as a code $C_j$, and said second scrambling code is represented as at least one of a code $C_{j,1}$ or a code $C_{j,2}$.

15. The system of claim 13, wherein said second channelization code is one level closer to a root of a channelization code tree than said first channelization code.

16. The system of claim 13, wherein said first scrambling code, said first channelization code, said second scrambling code, and said second channelization code are generated for scrambling and channelization in a physical channel.

17. The system of claim 13, wherein said spread spectrum system comprises a CDMA system.

18. The system of claim 14, wherein each of said code $C_{j,1}$ and said code $C_{j,2}$ are generated by modifying a start value used for said normal transmission mode in at least one of a scrambling code generator shift register or a plurality of scrambling code generator shift registers.

19. The system of claim 14, wherein each of said code $C_{j,1}$ and said code $C_{j,2}$ are generated with a different code phase than said first scrambling code.

20. The system of claim 13, wherein said slotted transmission mode is used for an inter-frequency handover measurement.

21. The system of claim 13, wherein said second channelization code comprises said first channelization code and a modifying code.

22. The system of claim 13, wherein said second scrambling code comprises said first scrambling code and a modifying code.

23. The system of claim 21 or 22, wherein said modifying code comprises a Bent sequence.

24. The system of claim 14, further comprising the steps of:
    means for determining if said first channelization code is located on a lower branch of a channelization code tree, and if so, selecting code $C_{j,1}$ for scrambling during a slotted mode transmission; and
    means for determining if said first channelization code is located on an upper branch of said channelization code tree, and if so, selecting code $C_{j,2}$ for scrambling during said slotted mode transmission.

25. A method for allocating scrambling codes in a spread spectrum cellular communications system, comprising the steps of:

generating a first scrambling code and a first channelization code for a normal transmission mode; and generating a second scrambling code and a second channelization code for a slotted transmission mode, wherein said second scrambling code comprises said first scrambling code and a modifying code.

26. The method of claim 25, wherein said first scrambling code is represented as a code $C_j$, and said second scrambling code is represented as at least one of a code $C_{j,1}$ or a code $C_{j,2}$.

27. The method of claim 26, wherein each of said code $C_{j,1}$ and said code $C_{j,2}$ are generated by modifying a start value used for said normal transmission mode in at least one of a scrambling code generator shift register or a plurality of scrambling code generator shift registers.

28. The method of claim 26, wherein each of said code $C_{j,1}$ and said code $C_{j,2}$ are generated with a different code phase than said first scrambling code.

* * * * *